UNITED STATES PATENT OFFICE.

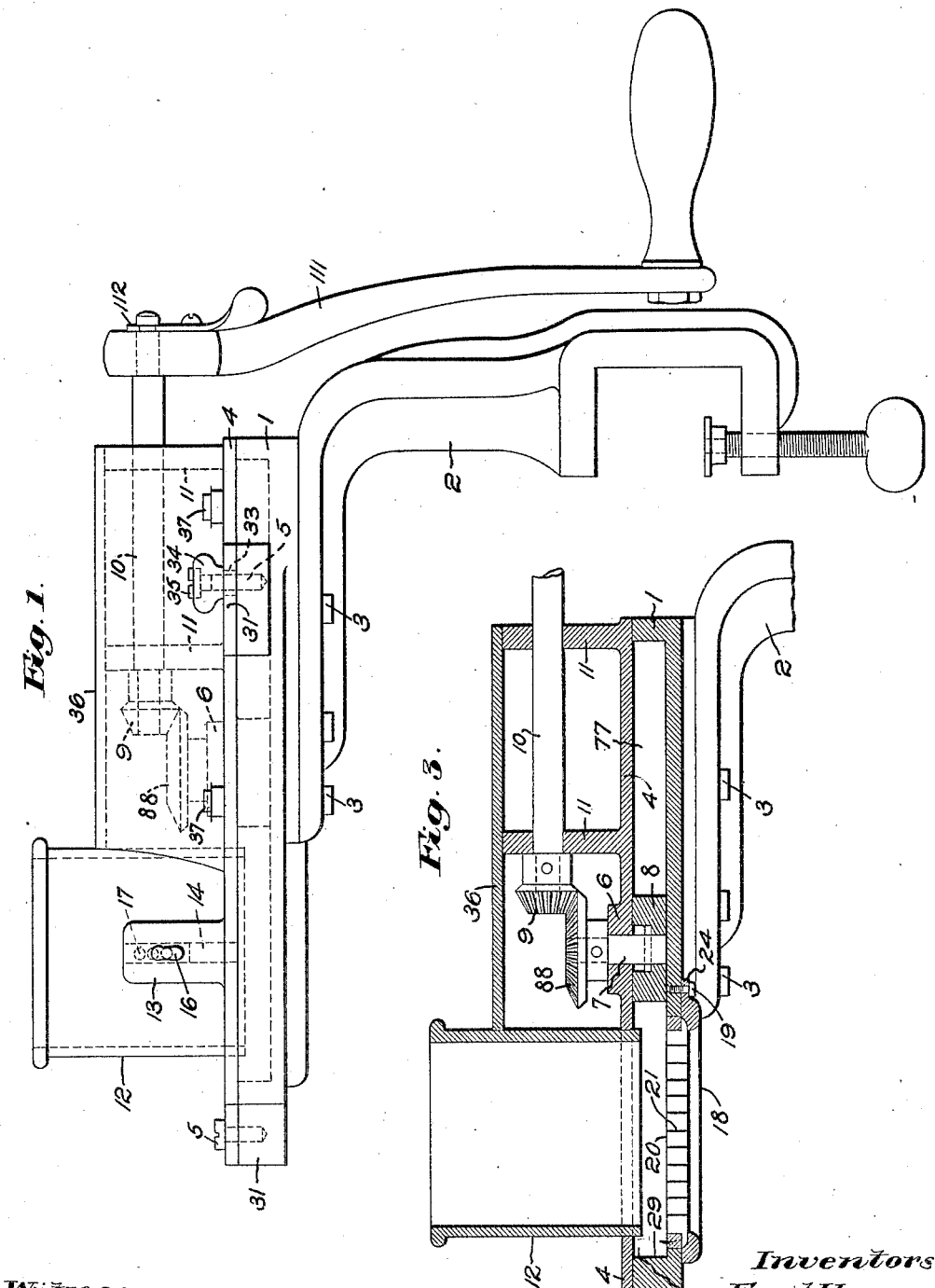

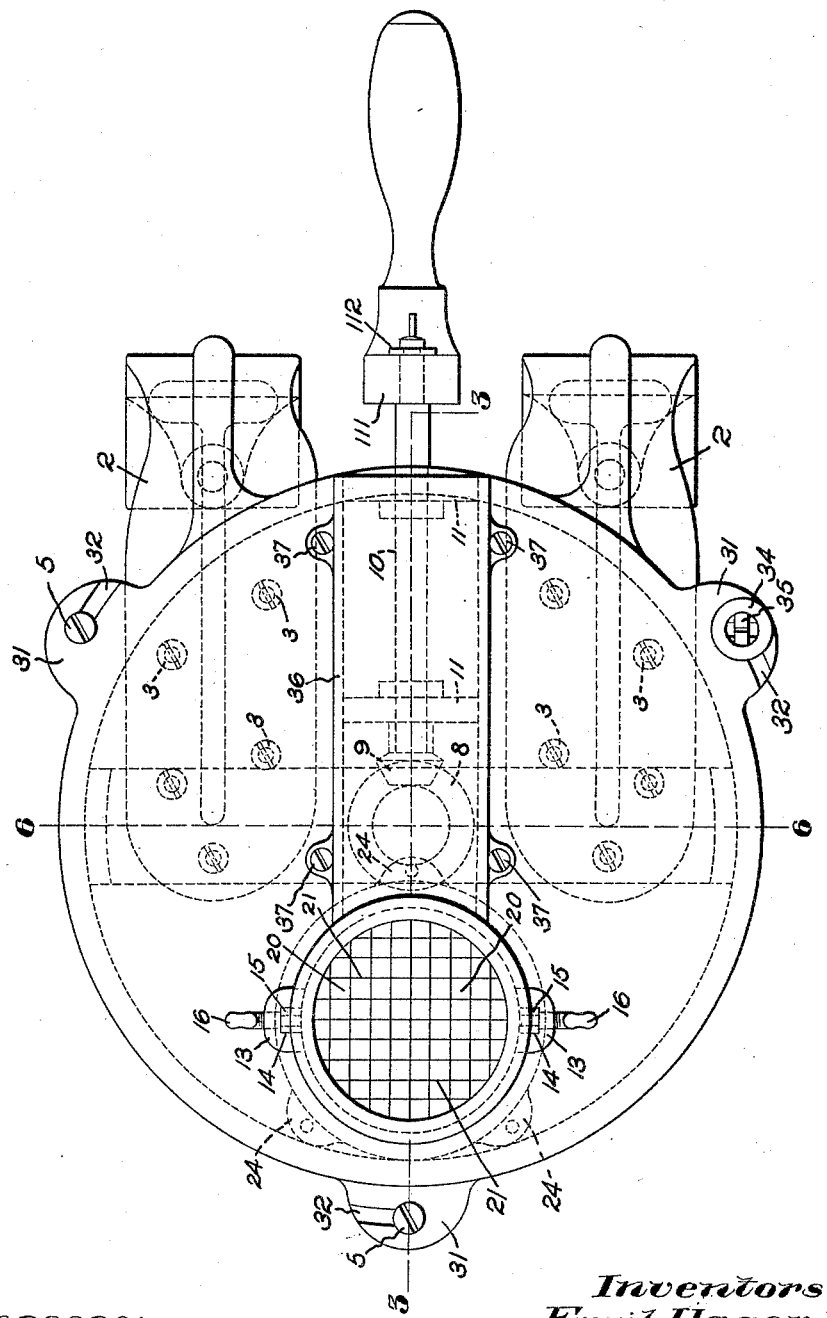

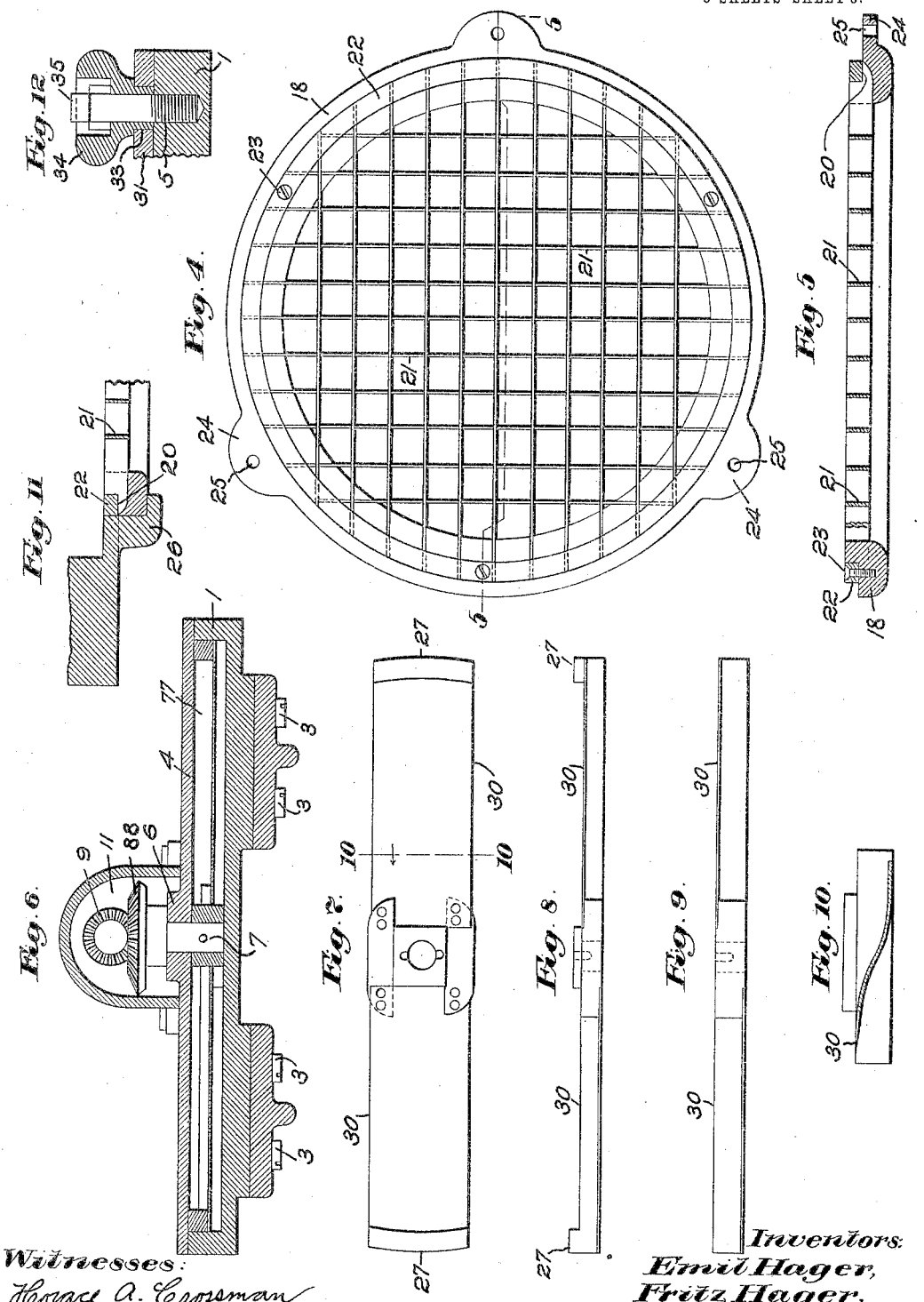

EMIL HAGER AND FRITZ HAGER, OF BOSTON, MASSACHUSETTS.

VEGETABLE CUTTING AND FASHIONING MACHINE.

1,068,123.   Specification of Letters Patent.   Patented July 22, 1913.

Application filed March 8, 1912. Serial No. 682,356.

*To all whom it may concern:*

Be it known that we, EMIL HAGER and FRITZ HAGER, citizens of the Republic of Switzerland, and residents of Boston, in the county of Suffolk and State of Massachusetts, have invented an Improvement in Vegetable Cutting and Fashioning Machines, of which the following description, in connection with the accompanying drawings, is a specification, like characters on the drawings representing like parts.

This invention relates to means for cutting fruits and vegetables into small pieces of any desired configuration for use in cooking, as in soup, for instance, and garnishing dishes such as salads and other similar dishes, and it aims to provide an improved machine for that purpose.

In the drawing of the embodiment of our invention selected for illustration and description herein Figure 1 is a side elevation thereof; Fig. 2, a plan thereof; Fig. 3, a vertical section on the line 3—3, Fig. 2; Fig. 4, a plan of one form of fashioning and cutting member; Fig. 5, an edge view, partly in section, of the fashioning knife carrying frame on the line 5—5 of Fig. 4; the knives being removed; Fig. 6, a vertical section on the line 6—6 Fig. 2; Fig. 7, a view of the top face of the rotary knife; Fig. 8, an edge view of the rotating knife; Fig. 9, an edge view of another form of rotating knife; Fig. 10, a vertical section of the knife shown in Fig. 7; on the line 10—10 Fig. 7; Fig. 11, a detail of a modified form of knife carrying frame; Fig. 12, a detail of the cover locking device shown in Fig. 2.

In Figs. 1, 2, 3, we have shown one form of our invention as comprising a hollow base plate 1, of desired exterior configuration and of suitable material, as metal, which may be cast or struck up and provided with one or more suitable and convenient clamps 2, to which it is secured in any convenient manner as by screws 3, by means of which clamps the machine may be secured to a table, shelf, or other suitable support. The plate 1 has a suitable cover or top plate 4, see Figs. 1 and 2, preferably of metal, which may be removably secured to said plate 1 in any manner, as by screws 5, and said top plate 4 is, at a suitable point, preferably formed to provide a bearing 6, to receive a shaft 7, carrying at its lower end, in the cutting chamber 77, a movable knife 8, preferably one of several different sizes, and at its upper end a bevel gear 88 which is in mesh with a similar gear 9 on the inner end of shaft 10, having bearings in the uprights 11 and provided with means to impart motion thereto as a crank 111. The outer end of the shaft 10 is reduced in size to take the crank 111 thereon and is slotted laterally on opposite sides to receive the locking member 112 movably secured to the crank 111 to lock the same to the shaft.

The top plate 4 is provided at a suitable point thereon, see Figs. 2 and 3, with a feed opening of desired shape and size, herein round, leading to the cutting chamber 77 and adapted also to receive the lower end of a hopper 12 for the material to be cut. The top plate 4 is shown, Figs. 1 and 2, as provided with a plurality of upright posts 13 having slots 14 on the inner faces thereof to receive bead-like strips 15 on the sides of the hopper 12, by means of which the hopper may be guided and raised or lowered relative to the movable knife 8 and plate 4 for a purpose to be described. The hopper 12 is adapted to be retained in desired position by any convenient means as spring pressed pins 16 adapted to enter holes 17 therefor in the faces of the strips 15 which are preferably spaced at predetermined distances to correspond to the height of the various sizes of the movable knife 8 to be referred to later.

In the bottom plate 1, see Fig. 3, and substantially opposite the lower end of the hopper 12, is an opening of any desired size and outline, herein round, adapted to receive a fashioning knife carrying frame 18, see also Fig. 4, which may be secured to this plate by means of screws 19, Fig. 3, or other convenient means, the said opening also serving as a discharge outlet for the cut material. This knife carrying frame 18 is shown herein, Fig. 4, as substantially round on its lower face and is rabbeted and provided, Fig. 5, at its inner edge and upper face with a plurality of slots 20 adapted to receive the ends of fashioning and cutting knives 21, which may be disposed in any desired fanciful design, herein in substantial parallel lines, and crossing each other at substantially right angles, the ends of said knives being cut away to receive a locking ring 22 thereon which may be secured to the ring 18 by a suitable means as screws 23. The several knives are notched on their adjacent edges at the points where they intersect each other and are thereby adapted to engage each other to more firmly position them in proper position and retain them against displacement therefrom. It is obvious that by multiplying the number of slots 20 and knives therefor, the knives 21 may be disposed in any desired relation to and distance from each other to fashion the material cut thereby into pieces of any desired size and fanciful outline, or if preferred additional rings, each provided with a set of knives adapted to cut the material into pieces of a distinctive form or particular size, may be provided and locked in position as required. The ring 18 is provided with ears 24, having holes 25 to receive the screws 19 by means of which it may be secured to the plate 1.

In Fig. 11, we have shown a modified form of construction of the cutter ring 18 and securing means therefor wherein the ring is constructed without the ears 24 and may be supported by hangers 26 depending from the bottom of the base plate, the ring being placed in position by removing the top plate bodily for that purpose. In order that the pieces of material cut by the movable knife may be of any desired thickness the height of the several knives is varied within the limits of the height of the cutting chamber so that a knife may be used to cut material as required; and if cubical pieces are to be cut the movable knife will be of the same height as the spacing of the vertical fashioning knives. If the knife in use is of less height than the cutting chamber, as shown in Fig. 3, it is preferably provided with a flange 27, Fig. 8, at each end of the blade adapted to travel in a channel 28 formed between the wall 29 of the chamber 77 and the outer wall of the hopper 12 when the hopper is below the bottom face of the top plate, to keep the channel free from material which might otherwise collect and remain therein. When the knife used is of such height that it substantially fills the space referred to, see Fig. 9, then of course no such flange is necessary.

The knife shown in Figs. 7 and 8 is provided with two cutting edges 30, Fig. 7, each extending throughout substantially one-half the length of the knife and oppositely disposed as to their cutting edges so that on rotation of the knife one cutting edge follows the other. In order to fashion the cut pieces of material in outline as the thin slices are cut substantially horizontally by the knife 8, we have curved the knife blade, Fig. 10, backwardly and downwardly from its cutting edge, so that as the slice of material is severed from the article of fruit, for instance, it is, as the knife continues its rotation, pressed and fed downwardly against and between the fashioning and cutting knives 21, so that as it emerges from beneath and between the knives 21 the various pieces of material are fashioned according to the particular design of the knives 21; thus if a knife 8 of the height of the spaces between the knives 21 were used the pieces of material would be fashioned into cubes. It will be observed that by this means the material will be presented to and fashioned by the cutters 21 in its original condition, that is containing its juices, as distinguished from the operation of other machines wherein the material is first reduced to a pulp and deprived of its juices before it is discharged from the machine. The hopper 12, as pointed out, is adapted to be adjusted upon its supports 13, to correspond to the height of the knife 8 to be used.

The plate 4, Fig. 2, is provided with ears 31, having slots 32 by means of which the plate may be readily removed from engagement with screws 5 by a slight rotative movement thereof. One of the ears 31 may be provided with an aperture 33 at the end of the slot 32 to receive the end of a locking member, shown as a handle 34, bored to receive the screw 5 and its head, and adapted to be raised thereabout and from the aperture 33, to unlock the plate 4, the handle being grooved substantially vertically to permit the sliding therein of the rectangular head 35 of the screw 5. By dropping the handle 34 into the aperture 33 and then turning it slightly relative to the head 35 and beneath the same the plate 4 may be securely locked in position.

In use the material is fed into the hopper, and pressed down if desired, and as the knife 8 rotates the material is cut substantially horizontally into slices by the knife edges 30 and, owing to the formation of the blades, as they pass over the cut material they force it down upon and between the vertical knives 21 which fashion the pieces as described whence they fall into any suitable receptacle therefor. A hood or cover 36 may be provided for the shaft 10 and gears 88 and 9 to protect them from dust and also for safety, and it may be secured to the plate 4 by any convenient means as screws 37.

By our improved cutting and fashioning machine material may be rapidly cut both laterally and vertically into a plurality of varying, fanciful or uniform pieces of attractive appearance and retain the juice and natural flavor. Doubtless our invention may be embodied in other constructions without departing from the spirit and scope thereof.

Claims:

1. A machine of the class described comprising in combination, a base, a stationary cutter therein comprising a cutter supporting ring provided with laterally extended slots, angularly disposed cutters received by said slots, a locking ring to lock said cutter ends in said slots and to said supporting ring, said base containing a cutting chamber, a rotatable cutting member therein comprising a hub, thin, laterally curvilinear cutters thereon provided with chamber clearing flanges, means to operate the same, and a hopper in said cutting chamber adjustable therein to permit the use of knives of varying dimensions to cut material into cubes of different sizes.

2. A machine of the class described, comprising, in combination, a base, a stationary cutter therein, a cutting chamber, a rotatable cutter therein, a hopper adjustable in said chamber to permit the use of cutters of different sizes to cut material into cubes of varying dimensions, a top for said chamber provided with laterally extending ears, locking slots in said ears, screws on said base adapted to be received by said slots, a locking member mounted and longitudinally movable on one of said screws and having shoulders adapted to register with the head of said screw, said locking member normally acting to lock said top against removal from the base and adapted, upon the registration of said shoulders with said screw head, to be raised about said screw to free it from contact with said top to permit removal of the top.

3. A machine of the class described comprising, in combination, a cutting chamber, cutting members in the wall of said cutting chamber, a cutter shaft mounted substantially vertically in said chamber, a gear on one end of said shaft, a pinion in mesh therewith, a laterally disposed operating shaft carrying said pinion, a revoluble cutter mounted intermediate its ends on said cutter shaft and provided with a plurality of normally oppositely positioned cutting edges adapted to rotate in substantially the same plane and substantially parallel with and below said operating shaft, a hopper positioned directly above said revoluble cutter to promote gravity feeding of the material directly to the cutters at substantially equal speed throughout the cross sectional area of the hopper.

In testimony whereof, we have signed our names to this specification, in the presence of two subscribing witnesses.

EMIL HAGER.
FRITZ HAGER.

Witnesses:
EVERETT S. EMERY,
ROBERT H. KAMMLER.

---

Copies of this patent may be obtained for five cents each, by addressing the "Commissioner of Patents, Washington, D. C."